(No Model.)

F. P. HUFF.
GUARD FOR PIE PLATES AND SIMILAR PANS.

No. 380,116. Patented Mar. 27, 1888.

WITNESSES.
J. M. Dolan,
E. P. Small.

INVENTOR.
Frederic P. Huff,
by Atty
Clarke & Raymond,
Thos. Wm. Clarke

UNITED STATES PATENT OFFICE.

FREDERICK P. HUFF, OF BOOTHBAY, MAINE.

GUARD FOR PIE-PLATES AND SIMILAR PANS.

SPECIFICATION forming part of Letters Patent No. 380,116, dated March 27, 1888.

Application filed March 7, 1887. Serial No. 229,954. (No model.)

*To all whom it may concern:*

Be it known that I, FREDERICK P. HUFF, of Boothbay, in the county of Lincoln and State of Maine, have invented a new and useful Improvement in Guards for Pie-Plates and Similar Pans, of which the following is a full, clear, and exact description.

My invention relates to a detachable guard for pie-plates and similar pans, and has for its object to provide a means of preserving all the juice of the fruits or meats within the vessel.

The invention consists in providing a pie-plate or similar vessel with a detachable encircling guard, as will be hereinafter fully set forth, and pointed out in the claim.

Reference is to be had to the accompanying drawings, forming a part of this specification, in which similar letters of reference indicate corresponding parts in all the figures.

Figure 1:
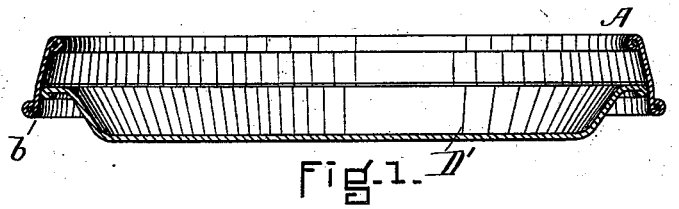
Figure 2:
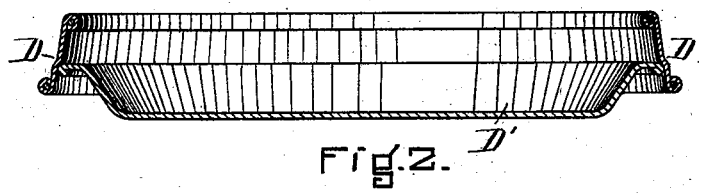
Figure 3:
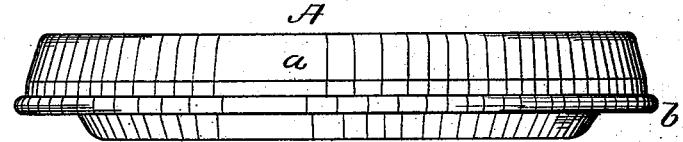
Figure 4:
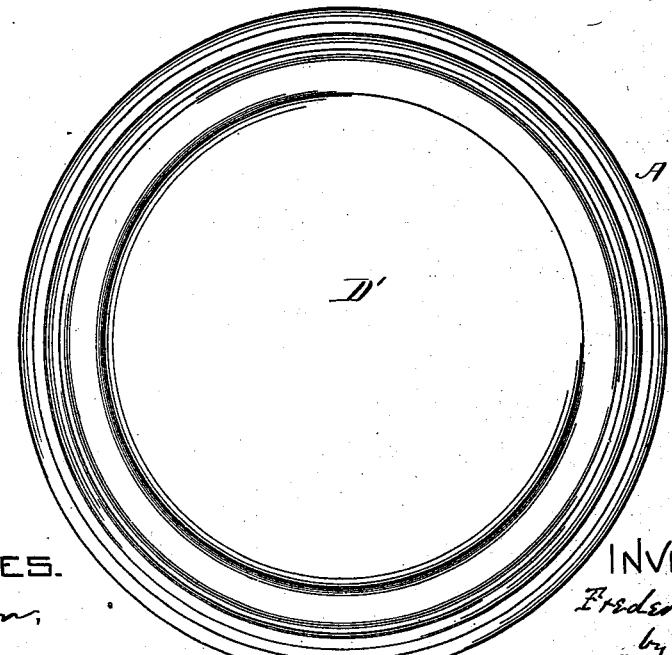

Figure 1 is a transverse vertical section through a pan having a plain guard attached, and Fig. 2 a transverse vertical section through a pan having a beaded guard attached thereto. Fig. 3 is a side elevation of the guard and plate inclosed. Fig. 4 is a plan view of an incased plate.

A is a guard, of tin or other suitable material, made of a contour similar to the vessel adapted to be inclosed, the said guard being preferably constructed with tapering sides $a$, as shown in Fig. 3. The guard is stayed or strengthened by a wire rod, $b$, incased in the edge of the widest end, which end is slightly larger than the vessel, D', to be surrounded. The rod $b$ is, however, not essential to the effectiveness of the device, as other well-known means of stiffening the guard may be employed. In operation, after the pie has been formed in the pan, the larger end of the guard is pressed or sprung over the edges of the said vessel, the tapering sides serving to hold the guard in close contact with the vessel, and the said guard being of a width sufficient to project above the edges, any escaping juices are prevented from overflowing and are duly absorbed by the crust. A central bead, D, is sometimes made upon the outer side of the guard, as shown in Fig. 2, whereby a slight groove is produced upon the inside. When such is the case, as the guard is sprung over the vessel the edges of said vessels are received by said groove and a tight joint thereby effected.

The guard, it will be observed, serves a twofold purpose: first, as a cutter or trimmer for the edges of the crust, binding them together in process of cutting, and as a retainer for the juices of the material used in the manufacture of the pies. When the pie is sufficiently cooked, the guard may quickly and readily be removed.

Having thus fully described my invention, I claim as new and desire to secure by Letters Patent—

The detachable guard for pie-plates and similar articles, formed as a continuous annular ring, A, the sides $a$ whereof are tapered from top to bottom, which guard is adapted to surround and project above and below the edge of the plate to which it is applied, and to be fitted upon it from above only, substantially as described.

FRED. P. HUFF.

Witnesses:
J. F. ACKER, Jr.,
E. M. CLARK.